United States Patent
Xiao et al.

(10) Patent No.: US 10,425,368 B2
(45) Date of Patent: Sep. 24, 2019

(54) INFORMATION PROCESSING METHOD, USER EQUIPMENT, SERVER, AND COMPUTER-READABLE STORAGE MEDIUM

(71) Applicant: TENCENT TECHNOLOGY (SHENZHEN) COMPANY LIMITED, Shenzhen, Guangdong (CN)

(72) Inventors: Siyu Xiao, Shenzhen (CN); Xiaoyu Yu, Shenzhen (CN); Libin Ren, Shenzhen (CN); Yongjie Li, Shenzhen (CN); Wei Mao, Shenzhen (CN); Yi Gao, Shenzhen (CN); Mengsha Zhou, Shenzhen (CN); Zhenzhen Xu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 195 days.

(21) Appl. No.: 15/656,236

(22) Filed: Jul. 21, 2017

(65) Prior Publication Data
US 2017/0324693 A1 Nov. 9, 2017

Related U.S. Application Data

(63) Continuation of application No. PCT/CN2016/072503, filed on Jan. 28, 2016.

(30) Foreign Application Priority Data
Feb. 11, 2015 (CN) .......................... 2015 1 0073990

(51) Int. Cl.
*H04L 12/58* (2006.01)
*G06F 17/30* (2006.01)
(Continued)

(52) U.S. Cl.
CPC ............ *H04L 51/18* (2013.01); *G06F 3/0482* (2013.01); *G06F 16/951* (2019.01); *H04L 51/10* (2013.01)

(58) Field of Classification Search
CPC ......... H04L 51/18; H04L 51/10; H04L 63/08; H04L 63/20; H04L 63/10; G06F 16/951; G06F 3/0482; G06F 17/32; G06F 3/122
(Continued)

(56) References Cited

U.S. PATENT DOCUMENTS 7,913,176 B1 3/2011 Blattner
8,131,816 B2 3/2012 Robinson
(Continued)

FOREIGN PATENT DOCUMENTS

CN 1965314 A 5/2007
CN 102770862 A 11/2012
(Continued)

OTHER PUBLICATIONS

International Search Report in international application No. PCT/CN2016/072503, dated Apr. 28, 2016.
(Continued)

*Primary Examiner* — Tu T Nguyen
(74) *Attorney, Agent, or Firm* — Oppedahl Patent Law Firm LLC

(57) ABSTRACT

A first selectable command is displayed on a User Interface (UI) of the UE, and a first request is sent to a server via the UI, such that the server returns a first message of a non-text type; the first message returned by the server is received, and it is determined that the first message supports display of specified information; first operation applied on a result displayed by the first message is received, and a second request is sent, via the first operation, to the server to draw random information; in response to the first operation,
(Continued)

display of the specified information is triggered, and the random information drawn from the server is received.

11 Claims, 9 Drawing Sheets

(51) Int. Cl.
*G06F 16/951* (2019.01)
*G06F 3/0482* (2013.01)

(58) Field of Classification Search
USPC .......................................................... 709/204
See application file for complete search history.

(56) References Cited

U.S. PATENT DOCUMENTS

| | | |
|---|---|---|
| 2004/0111475 A1 | 6/2004 | Schultz |
| 2004/0179037 A1 | 9/2004 | Blattner |
| 2005/0234883 A1 | 10/2005 | Szeto |
| 2008/0162438 A1 | 7/2008 | Szeto |
| 2009/0098920 A1* | 4/2009 | Toompere ............... G07F 17/32 463/16 |
| 2011/0137895 A1 | 6/2011 | Petrou |
| 2011/0294467 A1 | 12/2011 | Kim |
| 2012/0105358 A1 | 5/2012 | Momeyer |
| 2014/0324414 A1 | 10/2014 | Zhang et al. |
| 2014/0344707 A1 | 11/2014 | Zhang et al. |
| 2017/0324693 A1 | 11/2017 | Xiao et al. |

FOREIGN PATENT DOCUMENTS

| | | |
|---|---|---|
| CN | 102779304 A | 11/2012 |
| CN | 103095553 A | 5/2013 |
| CN | 103201714 A | 7/2013 |
| CN | 103634700 A | 3/2014 |
| CN | 103647696 A | 3/2014 |
| CN | 104125139 A | 10/2014 |
| CN | 104579934 A | 4/2015 |
| CN | 104615747 A | 5/2015 |
| WO | 2014176803 A1 | 11/2014 |

OTHER PUBLICATIONS

English Translation of the Written Opinion of the International Search Authority in international application No. PCT/CN2016/072503, dated Apr. 28, 2016.
Notification of the First Office Action of Chinese application No. 201510073990.6 , dated Dec. 17, 2015.
Notification of the Third Office Action of Chinese application No. 201510073990.6 , dated Nov. 28, 2016.
International Search Report in international application No. PCT/CN2016/072412, dated Apr. 28, 2016.
English Translation of the Written Opinion of the International Search Authority in international application No. PCT/CN2016/072412, dated Apr. 28, 2016.
English translation of Notification of the First Office Action of Chinese application No. 201510069810.7, dated Feb. 3, 2016.

* cited by examiner

INFORMATION PROCESSING METHOD, USER EQUIPMENT, SERVER, AND COMPUTER-READABLE STORAGE MEDIUM

CROSS REFERENCE TO RELATED APPLICATIONS

This is a continuation application of International Patent Application No. PCT/CN2016/072503, filed on Jan. 28, 2016, which claims priority to Chinese Application No. 201510073990.6 filed on Feb. 11, 2015, both disclosures being incorporated herein by reference in their entireties.

BACKGROUND

The inventor of the present application at least discovers, in a process of implementing the technical solutions in the embodiments of the present application, the technical problems in the related art as follows.

With development of internet technology, there comes an era of big data when massive amounts of information constantly spring up. To meet a demand for information sharing by public, information is processed with existing technology based on a social networking tool such as WeChat, Microblogging, etc. Excessive information may be shared in a social network. Offline processing may also be implemented online using a social networking tool. Different processing modes adopted in information sharing and online processing may impact efficiency in processing a user operation at a UE as well as a result of the user operation. Processing of the user operation at the UE may impact how information is transmitted and how information notification is implemented in interaction between the UE and a server. The more user operations at the UE, the more frequent the interaction between the UE and the server is triggered, which may take up excessive system resources at both the UE side and the server side. The massive amount of interaction may also lead to waste of network band width resources.

No effective solution exists for efficient, fast, and convenient information display and online processing by minimizing user operations and reducing interaction between a UE and a server.

SUMMARY

The disclosure relates to the communication technology, and in particular to an information processing method, a User Equipment (UE), a server, and a computer-readable storage medium.

In view of this, embodiments herein provide an information processing method, a UE, a server, and a computer-readable storage medium capable of solving at least a problem in existing art.

A technical solution according to an embodiment herein may be implemented as follows.

According to an embodiment herein, an information processing method applies to a User Equipment (UE); the method includes:

displaying a first selectable command on a User Interface (UI) of the UE, and sending, via the UI, a first request to a server, such that the server returns a first message of a non-text type;

receiving the first message returned by the server, and determining that the first message supports display of specified information;

receiving a first operation applied on a result displayed by the first message, and sending, via the first operation, a second request to the server to draw random information; and in response to the first operation, triggering display of the specified information, and receiving the random information drawn from the server.

According to an embodiment herein, a User Equipment (UE) includes:

a displaying unit configured for: displaying a first selectable command on a User Interface (UI) of the UE;

a first requesting unit configured for: sending, via the UI displayed on the UI of the UE, a first request to a server, such that the server returns a first message of a non-text type;

a receiving and determining unit configured for: receiving the first message returned by the server, and determining that the first message supports display of specified information;

a second requesting unit configured for: receiving a first operation applied on a result displayed by the first message, and sending, via the first operation, a second request to the server to draw random information; and a responding unit configured for: in response to the first operation, triggering display of the specified information, and receiving the random information drawn from the server.

The displaying unit, the first requesting unit, the receiving and determining unit, the second requesting unit, and the responding unit may be implemented by a Central Processing Unit (CPU), a Digital Signal Processor (DSP) or a Field-Programmable Gate Array (FPGA).

According to an embodiment herein, an information processing method applies to a server; the method includes:

receiving a first request sent by a User Equipment (UE) via a UI, and returning a first message to the UE according to the first request, the first message being of a non-text type;

receiving a second request sent by the UE via a first operation applied on a result displayed by the first message, and extracting a preset rule according to the second request;

randomly generating random information according to the preset rule; and returning the random information to the UE.

According to an embodiment herein, a server includes:

a message returning unit configured for: receiving a first request sent by a User Equipment (UE) via a UI, and returning a first message to the UE according to the first request, the first message being of a non-text type;

a rule extracting unit configured for: receiving a second request sent by the UE via a first operation applied on a result displayed by the first message, and extracting a preset rule according to the second request;

a random information generating unit configured for: randomly generating random information according to the preset rule; and a random information returning unit configured for: returning the random information to the UE.

The message returning unit, the rule extracting unit, the random information generating unit, and the random information returning unit may be implemented by a Central Processing Unit (CPU), a Digital Signal Processor (DSP) or a Field-Programmable Gate Array (FPGA).

According to an embodiment herein, a computer-readable storage medium has stored therein computer-executable instructions that, when executed by a processor, cause the processor to execute the information processing method.

With the information processing method according to an embodiment herein, a first selectable command is displayed on a User Interface (UI) of the UE, and a first request is sent to a server via the UI, such that the server returns a first message of a non-text type; the first message returned by the server is received, and it is determined that the first message supports display of specified information; a first operation applied on a result displayed by the first message is received, and a second request is sent, via the first operation, to the server to draw random information; in response to the first operation, display of the specified information is triggered, and the random information drawn from the server is received.

With the processing mode according to an embodiment herein, a first request is sent to a server via a UI, such that the server returns a first message of a non-text type; when it is determined that the first message supports display of specified information, a second request is sent to the server via a first operation to draw random information; the random information drawn from the server is received, and display of the specified information is triggered in response to the first operation. A user is required to input no information at a UE side. Information needed by the user may be drawn automatically merely by interactive response to various requests and touch operations of the user, minimizing user time in waiting for a result of the operations, implementing efficient, fast, and convenient online processing. In addition, the information may be accompanied by the display of the specified information and special effect, providing rich visual effects/forms.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Implementation of a technical solution herein will be further elaborated below with reference to the drawings.

Figure 1:
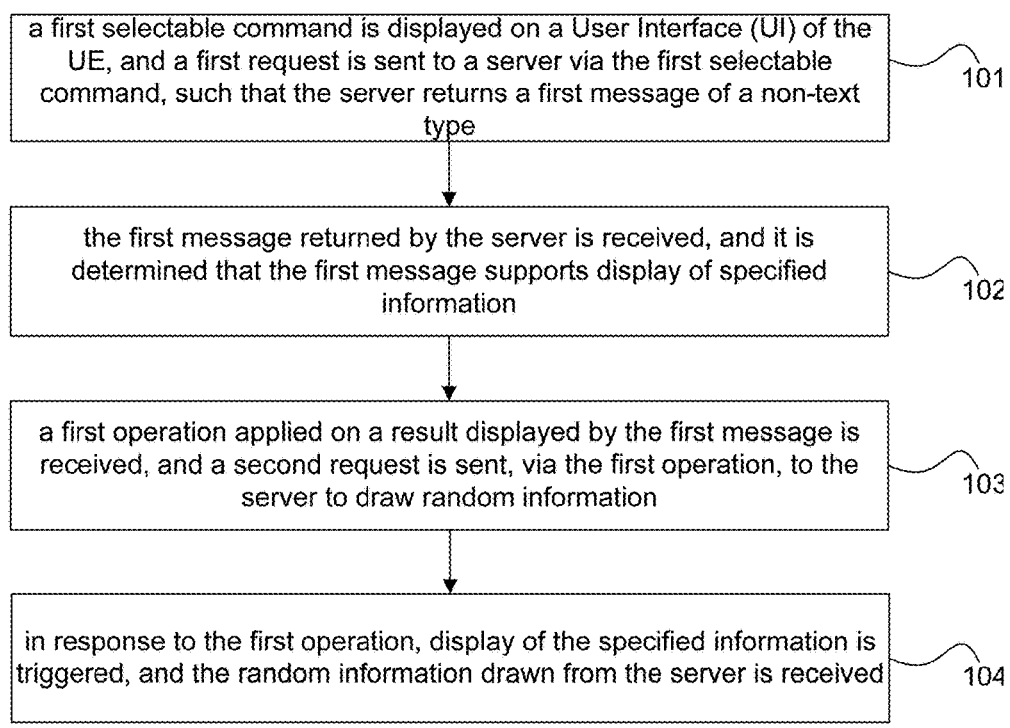
FIG. 1 is a flowchart of a Method Embodiment herein.

As shown in FIG. 1, an information processing method according to an embodiment herein applies to a UE. The method includes steps as follows.

In step 101, a first selectable command is displayed on a User Interface (UI) of the UE, and a first request is sent to a server via the first selectable command, such that the server returns a first message of a non-text type.

In step 102, the first message returned by the server is received, and it is determined that the first message supports display of specified information.

In step 103, a first operation applied on a result displayed by the first message is received, and a second request is sent, via the first operation, to the server to draw random information.

In step 104, in response to the first operation, display of the specified information is triggered, and the random information drawn from the server is received.

In a flow of step 101-104, a user is required to input no information, and the entire flow of interaction may be triggered by merely operating on an interactive object on a page containing the result displayed by the first message returned by the server on the entrance on the UI, reducing user operations during the entire flow, which reduces interaction between the UE and the server, thereby not only improving efficiency in processing the operations at the UE, minimizing time in waiting for a result of the operations, implementing efficient, fast, and convenient online processing, avoiding taking up excessive system resources at both the UE side and the server side as well as avoiding waste of network band width resources caused by massive amount of interaction. In the end, a special effect of the random information may be displayed, providing the user with a rich visual effect.

The first selectable command in step 101 may be an entrance to a New Year greeting red envelope in a WeChat application scene. The first message may be a message related to the New Year greeting red envelope. The first message may be non-text. The display of the specified information in step 102 may refer to triggering dropping of a moneybag "emoji", namely an egg. The first operation in step 103 may be a red envelope opening operation of a red envelope receiver or a red envelope sending operation of a red envelope sender. The random information in step 103 may include a small random amount and/or greetings. The greetings may be multimedia. The greetings may be plain text, a picture, a voice, a small video, etc.

Figure 2:
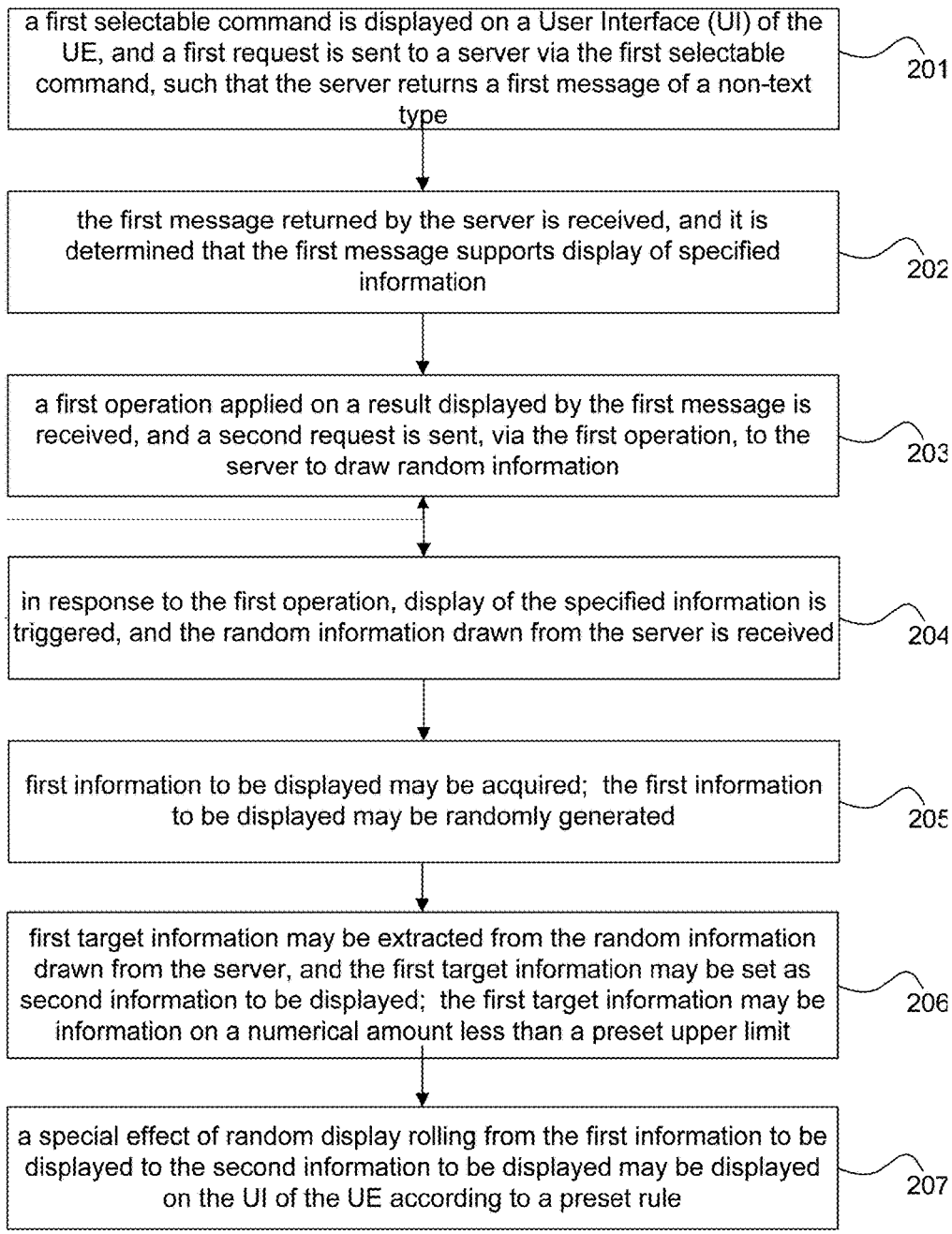
FIG. 2 is a flowchart of a Method Embodiment herein.

As shown in FIG. 2, an information processing method according to an embodiment herein applies to a UE. The method may include steps as follows.

In step 201, a first selectable command is displayed on a User Interface (UI) of the UE, and a first request is sent to a server via the first selectable command, such that the server returns a first message of a non-text type.

In step 202, the first message returned by the server is received, and it is determined that the first message supports display of specified information.

In step 203, a first operation applied on a result displayed by the first message is received, and a second request is sent, via the first operation, to the server to draw random information.

In step 204, in response to the first operation, display of the specified information is triggered, and the random information drawn from the server is received.

In step 205, first information to be displayed may be acquired; the first information to be displayed may be randomly generated.

In step 206, first target information may be extracted from the random information drawn from the server, and the first target information may be set as second information to be displayed; the first target information may be information on a numerical amount less than a preset upper limit.

In step 207, a special effect of random display rolling from the first information to be displayed to the second information to be displayed may be displayed on the UI of the UE according to a preset rule.

Note that step 204 and step 205 may be combined. That is, the random information drawn from the server may be received and displayed.

The first target information may be a small numerical amount such as RMB 1 yuan, RMB 5 yuan, etc. The special effect of random display may be implemented by changing a random number to a fixed small target amount returned by the server.

The special effect of random display may also be implemented by first displaying a rolling random number, and then displaying a tentative fixed amount upon a user click on a screen. The tentative fixed amount may be the first target information returned by the server, such as RMB 10 yuan, or a random amount, such as RMB 5 yuan, RMB 1.88 yuan, etc., that is less than an upper limit, namely RMB 10 yuan.

In an implementation herein, if the user is unhappy with a randomly extracted amount, the user may keep on clicking to continue rolling the figures. The user may stop clicking to stop at a fixed amount the user is happy with. Alternatively, the user may press the screen to roll the figures before reaching an upper limit of pressure. The user may stop pressing the screen to stop at a fixed number. The fixed number may be the first target information returned by the server, such as RMB 10 yuan, or a random amount, such as RMB 5 yuan, RMB 1.88 yuan, etc., that is less than an upper limit, namely RMB 10 yuan.

In an implementation herein, the method may further include steps as follows. Second target information may be extracted from the random information drawn from the server. The second target information may be set as third information to be displayed.

The second target information may be multimedia information.

Both the third information to be displayed and the second information to be displayed may be simultaneously displayed on the UI of the UE.

The second target information may refer to greetings displayed together with the small amount. The greetings are multimedia information, may be multimedia. The greetings may be multimedia. The greetings may be plain text, a picture, a voice, a small video, etc.

In an implementation herein, the random special effect, i.e., rolling from a random numerical amount/number to a target numerical amount/number (the first target information) returned by the server (achieved by triggering an egg dropping logic), may be displayed by the UI of the UE of at least one of a red envelope sender and a red envelope receiver. The displayed number may start from RMB 20 yuan and roll randomly to stop at RMB 5 yuan. In the end, the displayed number may be RMB 5 yuan. The red envelope receiver may receive RMB 5 yuan. It may be shown on the UI of the red envelope sender that a random amount of money, e.g., RMB 5 yuan, may be sent.

In an implementation herein, it may be determined the first message supports display of specified information as follows.

An established association logic that associates a non-text message with the specified information may be acquired.

The association logic may include at least identification of a non-text message. The identification may allow identifying a message type in line with the association logic.

A first identification corresponding to the first message may be acquired by analyzing the first message. It may be determined, according to the first identification, whether the first message is of the message type in line with the association logic. When the first message is of the message type in line with the association logic, it may be determined that the first message supports display of the specified information.

In an implementation herein, the association logic may further include that: when a pre-set operation is monitored, display of the specified information as supported by the first message is triggered.

In response to the first operation, display of the specified information may be triggered as follows.

It may be monitored that the first operation is applied on the result displayed by the first message. The display of the specified information may be triggered when the first operation matches the pre-set operation. The pre-set operation may include a screen touching operation on an interactive object in a page containing the result displayed by the first message.

The display of the specified information may refer to displaying a moneybag "emoji" as described in an application scene below. The first message may be an open-red-envelope message. Mere existence of the open-red-envelope message may not be enough to trigger egg dropping. A red envelope opening operation may be further triggered in a page displayed by the open-red-envelope message, such that the display of the specified information may be supported by a message of a non-text type. The red envelope opening operation may trigger dropping of a moneybag 'emoji', namely an egg. That is to say, with the embodiment, timing of dropping emoji eggs associated with a New Year greeting red envelope in a scene of WeChat may be controlled.

In an embodiment herein, the method may further include steps as follows. before the first operation directed to the first message is monitored and the display of the specified information is triggered in response to detecting the first operation matching the pre-set operation, a first parameter may be obtained by detecting a system operating environment of the terminal; an operating mode may be selected according to the first parameter, and processing may be performed by calling a processing logic corresponding to the operating mode. The processing may include at least one of the monitoring, the detecting, and the display.

Here, since terminals (UEs) such as those of an Android system and an Apple system support different systems and adopt different specific processing logics, such as different monitoring processes and monitoring controls, for monitoring the first operation directed to the first message and triggering the display of the specified information in response to detecting the first operation matching the pre-set operation. For example, the Apple system iOS may call a system UITouch control, create an object having a tapCount attribute, monitor a number of screen touches, i.e., how many times a user touches a screen, capture a clicking operation, and then trigger egg dropping accordingly. For example, the Android system may call a system oneclicklistener to monitor a number of screen touches, capture a clicking operation, and then trigger egg dropping accordingly, which will be elaborated in an example of an application scene below.

In an embodiment herein, the pre-set operation may include a screen touching operation on an interactive object in a prompt page displayed by the first message.

In an embodiment herein, a specific form in which the specified information is displayed may be controllably adjusted at a UE. An amount and a speed of dropping emoji eggs associated with a New Year greeting red envelope in a scene of WeChat may be controlled. Specifically, there may be two implementation modes as follows.

In the first mode, one touch operation may be recorded each time a match between the first operation and the pre-set operation is detected;

in response to monitoring a pre-set number of consecutive touch operations, a form in which the specified information is displayed may be changed. The form may include at least one of a displayed amount and a display speed.

The mode is based on multiple touching or pressing operation. For example, provided with a larger number of touches, eggs may drop at a greater speed and/or more eggs may drop. Controllable adjustment may stop when a pre-set upper limit of the number of touches is reached.

In the second mode, in response to detecting the first operation matching the pre-set operation, it may be determined whether a touch strength of the first operation reaches a pre-set pressure value; and in response to determining that the touch strength of the first operation reaches the pre-set pressure value, a form in which the specified information is displayed may be changed. The form may include at least one of a displayed amount and a display speed.

The mode is based on a long hard press. Upon reaching the pre-set pressure value, it may be triggered to drop eggs at a greater speed and/or to drop more eggs. The higher the pressure is, the faster eggs may drop and/or the more eggs may drop. Controllable adjustment may stop upon reaching a pre-set upper limit of pressure.

In an embodiment herein, the first message may be displayed on a user interface of a sender or a receiver;

the display of the specified information may be triggered according to the pre-set operation directed to the first message displayed on the user interface of the receiver.

Figure 3:
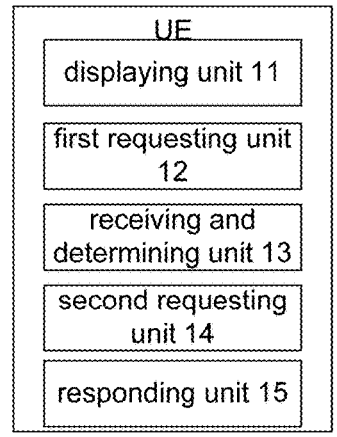
FIG. 3 is a diagram of a structure of a UE Embodiment herein.

As shown in FIG. 3, a UE according to an embodiment herein may include:

a displaying unit 11 configured for: displaying a first selectable command on a User Interface (UI) of the UE;

a first requesting unit 12 configured for: sending, via the first selectable command displayed on the UI of the UE, a first request to a server, such that the server returns a first message of a non-text type;

a receiving and determining unit 13 configured for: receiving the first message returned by the server, and determining that the first message supports display of specified information;

a second requesting unit 14 configured for: receiving a first operation applied on a result displayed by the first message, and sending, via the first operation, a second request to the server to draw random information; and a responding unit 15 configured for: in response to the first operation, triggering display of the specified information, and receiving the random information drawn from the server.

In an implementation herein, the responding unit may further include:

a first acquiring subunit configured for: acquiring first information to be displayed, the first information to be displayed being randomly generated; and an extracting subunit configured for: extracting first target information from the random information drawn from the server, and setting the first target information as second information to be displayed.

The displaying unit may be further configured for: displaying, on the UI of the UE according to a preset rule, a special effect of random display rolling from the first information to be displayed to the second information to be displayed.

In an implementation herein, the extracting subunit may be further configured for: extracting second target information from the random information drawn from the server, and setting the second target information as third information to be displayed.

The displaying unit may be further configured for: simultaneously displaying, on the UI of the UE, both the third information to be displayed and the second information to be displayed.

In an implementation herein, the receiving and determining unit may further include:

a second acquiring subunit configured for: acquiring an established association logic that associates a non-text message with the specified information, the association logic including at least identification of a non-text message, allowing a message type in line with the association logic to be identified by the identification; and an analyzing subunit configured for: acquiring a first identification corresponding to the first message by analyzing the first message; determining, according to the first identification, whether the first message is of the message type in line with the association logic; and in response to determining that the first message is of the message type in line with the association logic, determining that the first message supports display of the specified information.

In an implementation herein, the association logic may further include that: after a pre-set operation is monitored, display of the specified information as supported by the first message may be triggered.

The responding unit may further include a monitoring subunit configured for: monitoring the first operation applied on the result displayed by the first message, and triggering the display of the specified information in response to determining the first operation matching the pre-set operation. The pre-set operation may include a screen touching operation on an interactive object in a page containing the result displayed by the first message.

Figure 4:
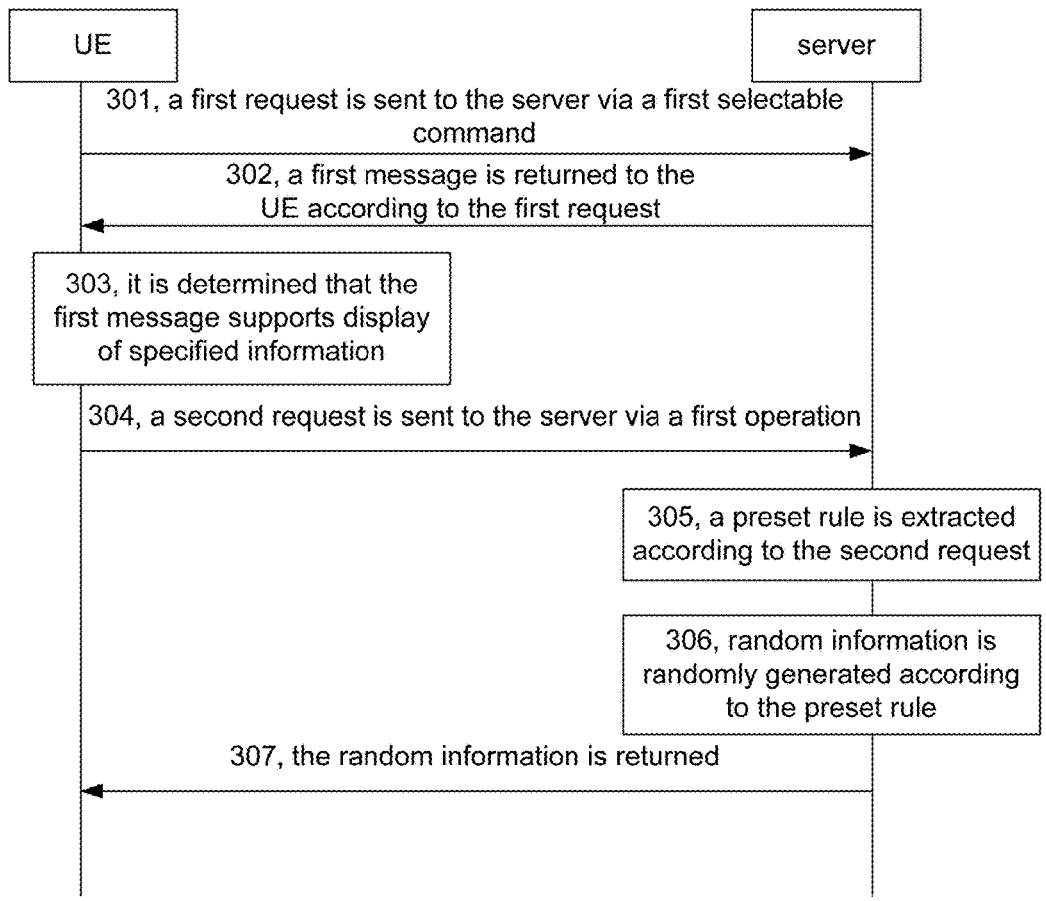
FIG. 4 is a flowchart of a Method Embodiment herein.

Interaction between a UE and a server according to an embodiment herein, as shown in FIG. 4, may include steps as follows.

In step 301, a first selectable command is displayed on a User Interface (UI) of the UE, and a first request is sent to the server via the first selectable command, such that the server returns a first message, which may be of a non-text type.

In step 302, the first request sent by the UE via the first selectable command is received, and the first message is returned to the UE according to the first request. The first message may be of a non-text type.

In step 303, the first message returned by the server is received, and it is determined that the first message supports display of specified information.

In step 304, a first operation applied on a result displayed by the first message is received, and a second request is sent, via the first operation, to the server to draw random information.

In step 305, the second request sent by the UE via the first operation applied on the result displayed by the first message is received, and a preset rule is extracted according to the second request.

In step 306, the random information is randomly generated according to the preset rule.

In step 307, the random information is returned to the UE. The random information may consist of first target information. The random information may consist of the first target information and second target information. The first target information may be set as second information to be displayed.

After step 307, the method may further include steps as follows.

In step 308, first information to be displayed may be acquired.

In step 309, a special effect of random display rolling from the first information to be displayed to the second information to be displayed may be displayed on the UI of the UE according to a preset rule.

In an implementation herein, the random information may be randomly generated according to the preset rule as follows. A random number generator may be called for extracting a random number in a pool of raw data. The first target information may be output by inputting the random number to a mathematical model for generating the random information. The first target information may be set as the random information.

In an implementation herein, the first target information may be on a numerical amount (of money) less than a preset upper limit. The random information may further include the second target information. The second target information may be multimedia information.

Figure 5:
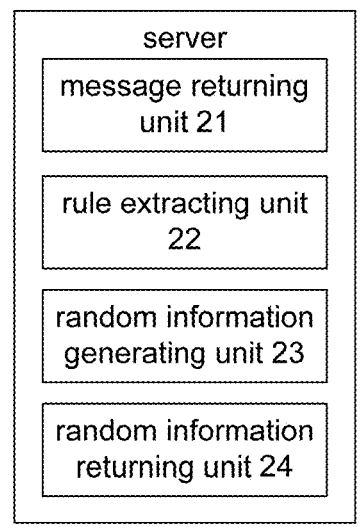
FIG. 5 is a diagram of a structure of a Server Embodiment herein.

As shown in FIG. 5, a server according to an embodiment herein may include:

a message returning unit 21 configured for: receiving a first request sent by a User Equipment (UE) via a first selectable command, and returning a first message to the UE according to the first request, the first message being of a non-text type;

a rule extracting unit 22 configured for: receiving a second request sent by the UE via a first operation applied on a result displayed by the first message, and extracting a preset rule according to the second request;

a random information generating unit 23 configured for: randomly generating random information according to the preset rule; and a random information returning unit 24 configured for: returning the random information to the UE.

In an implementation herein, the random information generating unit may be further configured for: calling a random number generator for extracting a random number in a pool of raw data; outputting first target information by inputting the random number to a mathematical model for generating the random information, and setting the first target information as the random information.

In an implementation herein, the first target information may be on a numerical amount less than a preset upper limit. The random information may further include the second target information. The second target information may be multimedia information.

Note that the UE may be, but not limited to: electronic equipment such as a Personal Computer (PC); portable electronic equipment such as a PAD, a tablet computer, a laptop, etc.; or a smart mobile UE such as a mobile phone. The server may be electronic equipment formed by a cluster system, integrated for implemented functions of the units, or with separate functioning units. Each of the UE and the server may include at least a database for data storage and a processor for data processing, or include a storage medium arranged separately or in a server.

The processor may be implemented with a microprocessor, a Central Processing Unit (CPU), a Digital Signal Processor (DSP), or a Field-Programmable Gate Array (FPGA). The storage medium may include computer-executable operation instructions that, when executed by a processor, cause the processor to execute the information processing method according to an aforementioned embodiment herein.

Figure 6:
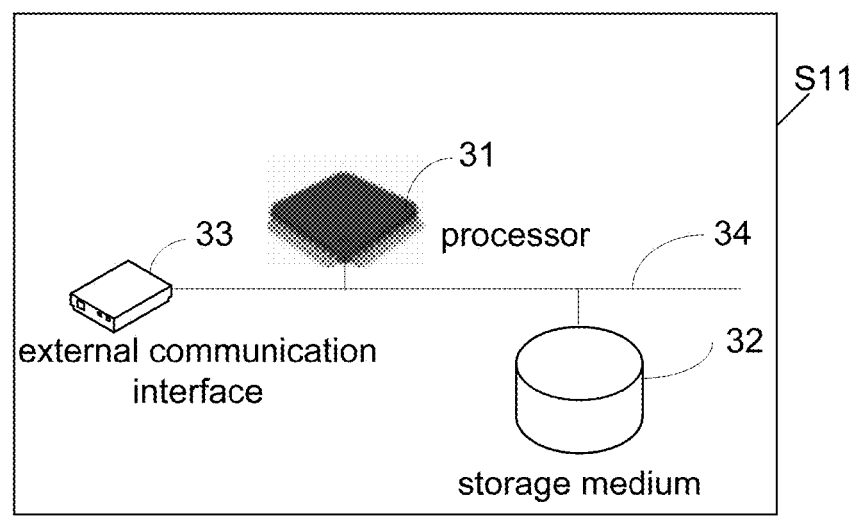
FIG. 6 is a diagram of a hardware entity of a UE or a server according to an embodiment herein.

An example of the UE and the server as a hardware entity S11, as shown in FIG. 6, may include a processor 31, a storage medium 32, and at least one external communication interface 33. The processor 31, the storage medium 32 and the external communication interfaces 33 are connected to each other by a bus 34.

Note that the above description relating to the UE and the server is similar to that relating to the method, with the same beneficial effect as the method, which is not repeated. One may refer to description in the method embodiments herein for technical details not disclosed for the UE and the server herein.

Description is made below with reference to a real application scene as an example.

The above embodiments herein may apply to a solution for implementing random New Year greeting red envelopes in a WeChat chat. A system may randomly give an amount and/or greetings according to a preset rule when a user triggers a red envelope sending operation. The amount and/or greetings may be set to be fixed. Retrigger of the red envelope sending operation may change the amount and/or the greetings.

In red envelope sending and receiving implemented by existing online payment, a user may have to take initiative to fill in an amount and greetings. The system may prompt but some rules such as a maximal amount and a minimal amount allowed in one red envelope, which turns out to be cumbersome. In terms of ease of use, a common user may rarely need to send a red envelope including a large amount. With an existing rule for a red envelope, it may cost a lot to send a red envelope. A user has to think over an appropriate amount as well as greetings, even when the user is to send a red envelope including but a small amount. With a random red envelope solution according to an embodiment herein, an amount and/or greetings may be randomly selected by the system, instead of being filled in by a user, thereby facilitating use of the red envelope function by more common user. The amount and/or greetings may be set to be fixed. If a user is not satisfied or happy with the fixed settings, the user may DIY to meet a predetermined condition. For example, the user may select an amount within an optional range below an upper limit returned by a system background server. In terms of technical implementation, the user is not required to take initiative to input an amount and greetings, thereby reducing user operations in the entire flow, reducing interaction between the UE and the server, improving efficiency in processing operations at the UE, minimizing time required to acquire a result of the operations, implementing efficient, fast, and convenient online processing, avoiding taking up excessive system resources at both the UE side and the server side, avoiding waste of network band width resources due to excessive interaction. In the end, a special effect of the random information may be displayed, providing the user with a rich visual effect.

For the application scene, an embodiment herein may be implemented as follows.

Figure 7:
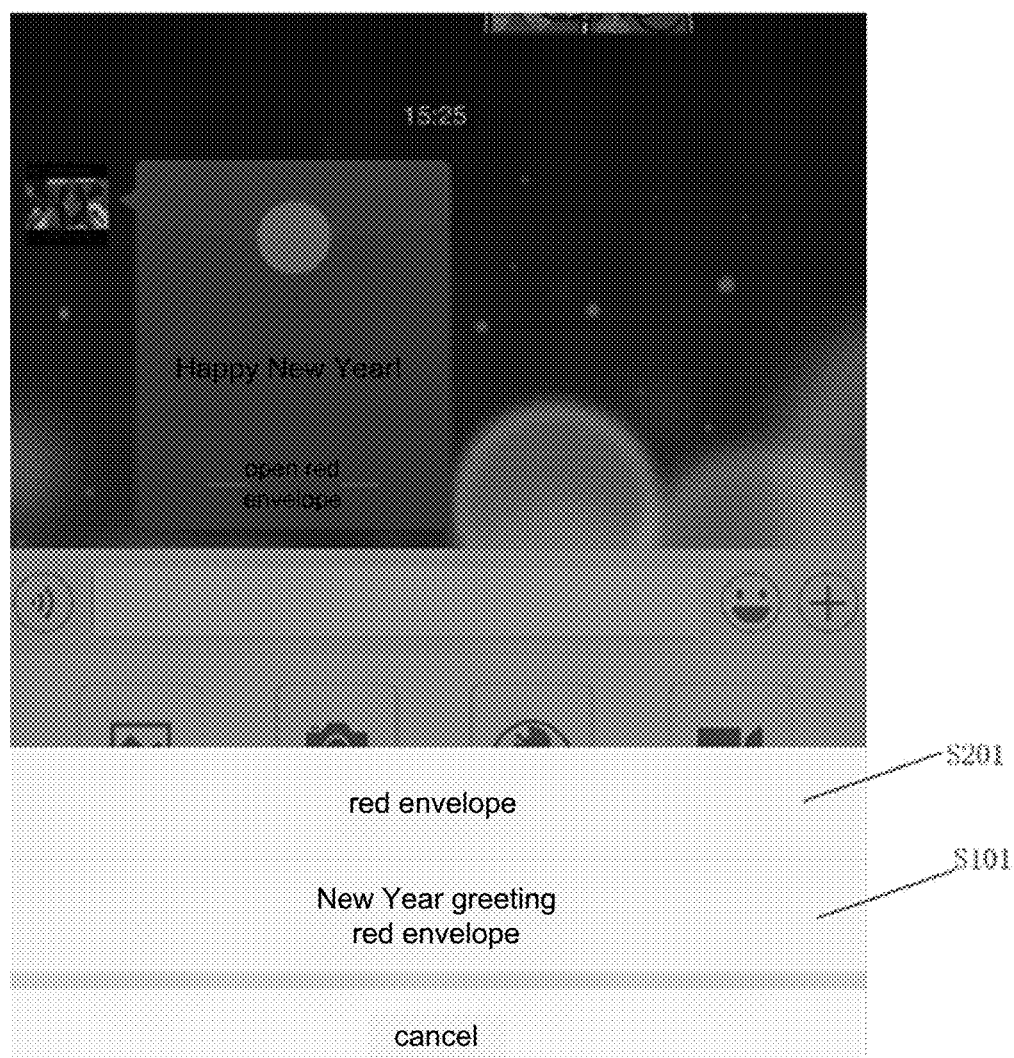
FIG. 7 to FIG. 11 each are a diagram of a scene applying an embodiment herein.

First, as shown in FIG. 7, an entrance S101 to a New Year greeting red envelope may be added in an attachment bar for a chat with an individual, alongside an entrance S201 to a common red envelope.

Second, a number of red envelopes may be set to be fixed as 1 by default.

Third, an amount included in the red envelope may be set as a random small amount. The system background server may prepare groups of fortunate or interesting small numerical amounts and/or greetings in advance and record the same in the background. A user at a UE side may click on the entrance to the New Year greeting red envelope. The UE may then send a request to the server. The server may return a random group of an amount and/or greetings, which may be displayed. When the user closes the page and then enters the page again, the request may be re-sent, another random group of an amount and/or greetings may be returned, and so on.

Figure 8:
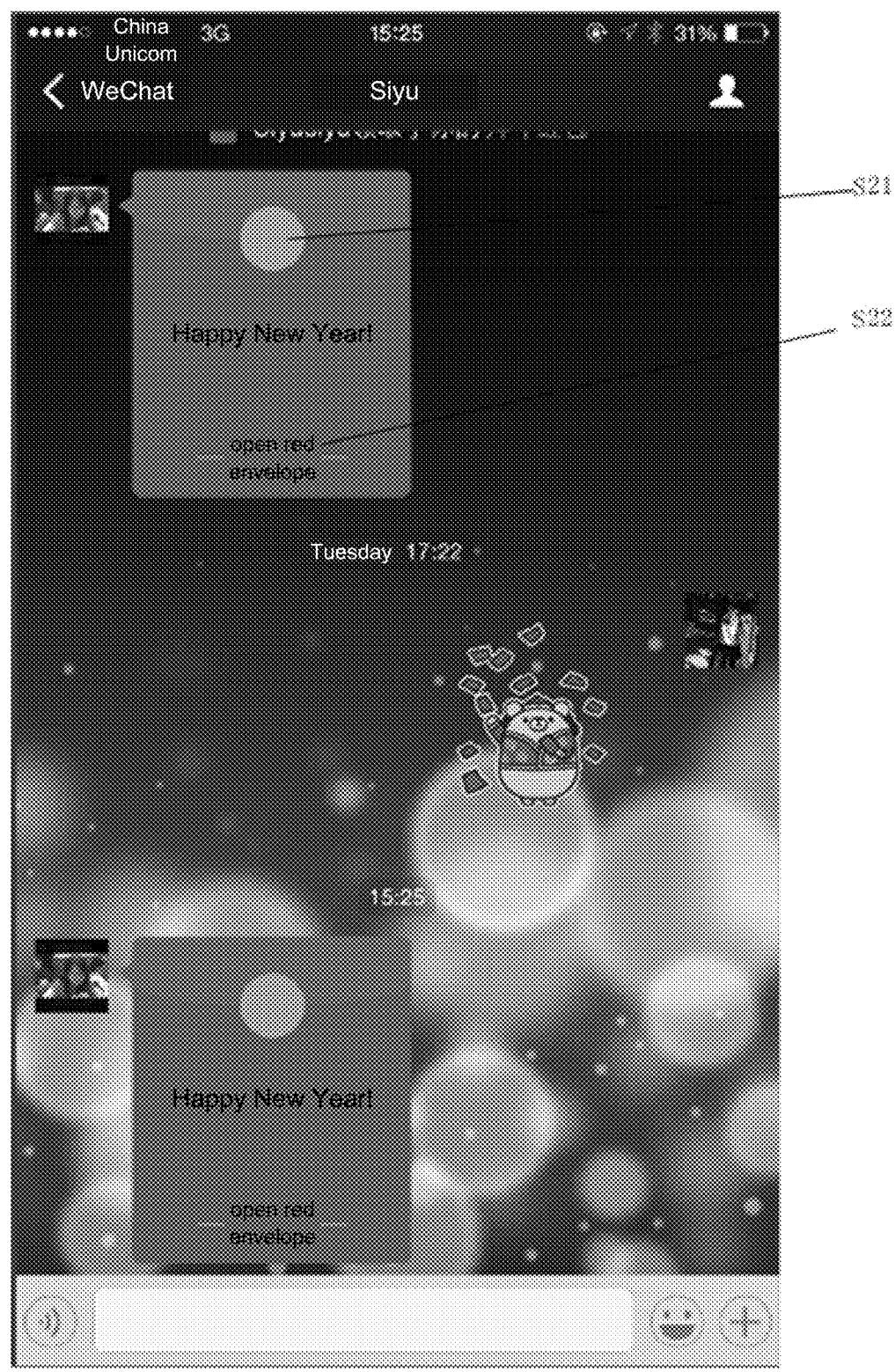
Figure 9:
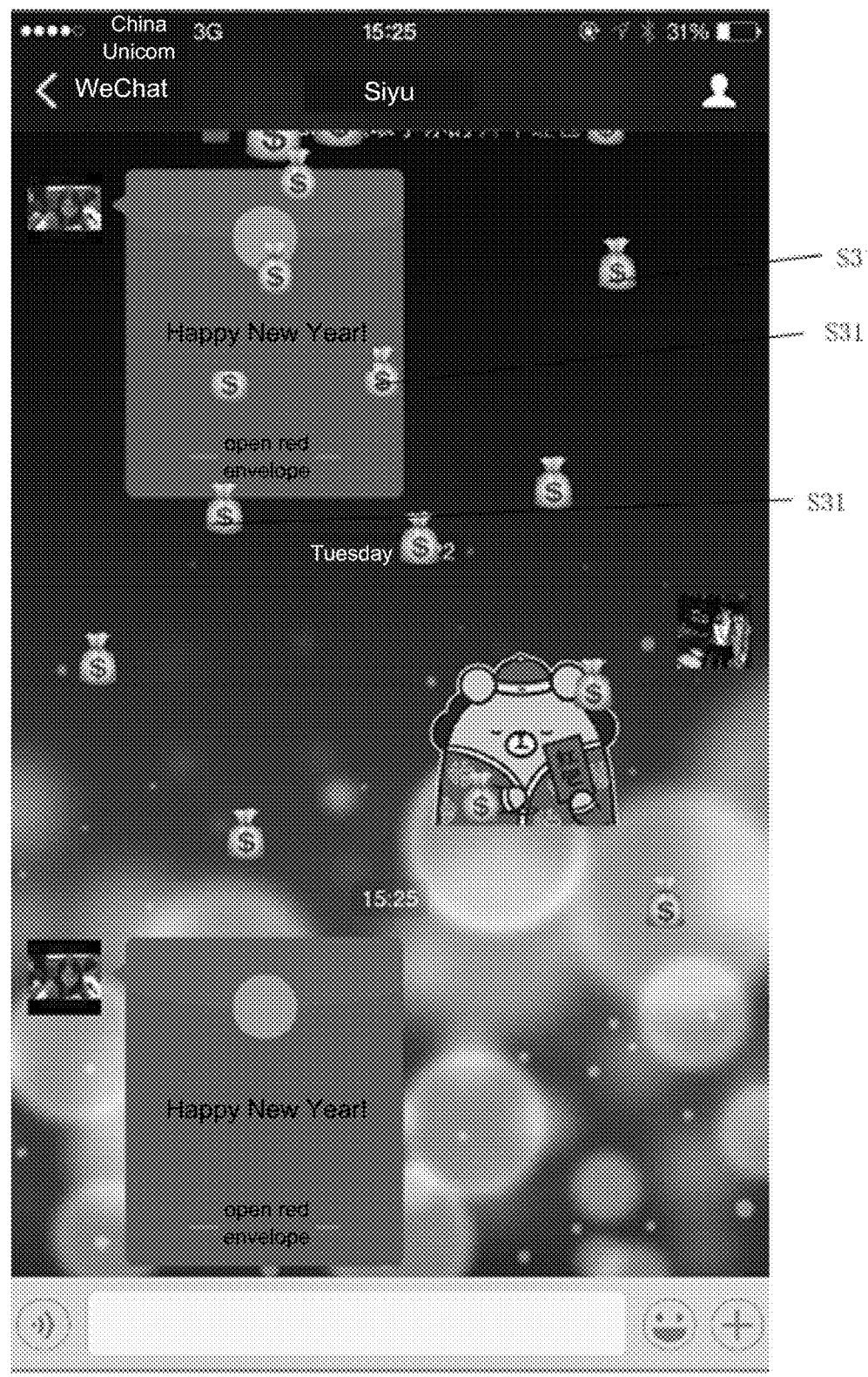

After the user clicks on the entrance S101 to the New Year greeting red envelope shown in FIG. 7, the system background server may return a display to open a red envelope as shown in FIG. 8. The user may then click on an interactive object shown in FIG. 8, which may be an object for triggering interaction such as red envelope opening or bubbling, such that egg dropping may be triggered. For example, the object for triggering interaction may be denoted by S21 or S22 shown in FIG. 8. In the application scene, chat egg dropping may be triggered by an operation of clicking on a red envelope opening bubble. Eggs may drop in a form as shown by S31 in FIG. 9, which is but an example. FIG. 9 may include many eggs. After an egg dropping logic is triggered, a special effect of random display may stop at a specific target numerical amount.

Figure 10:
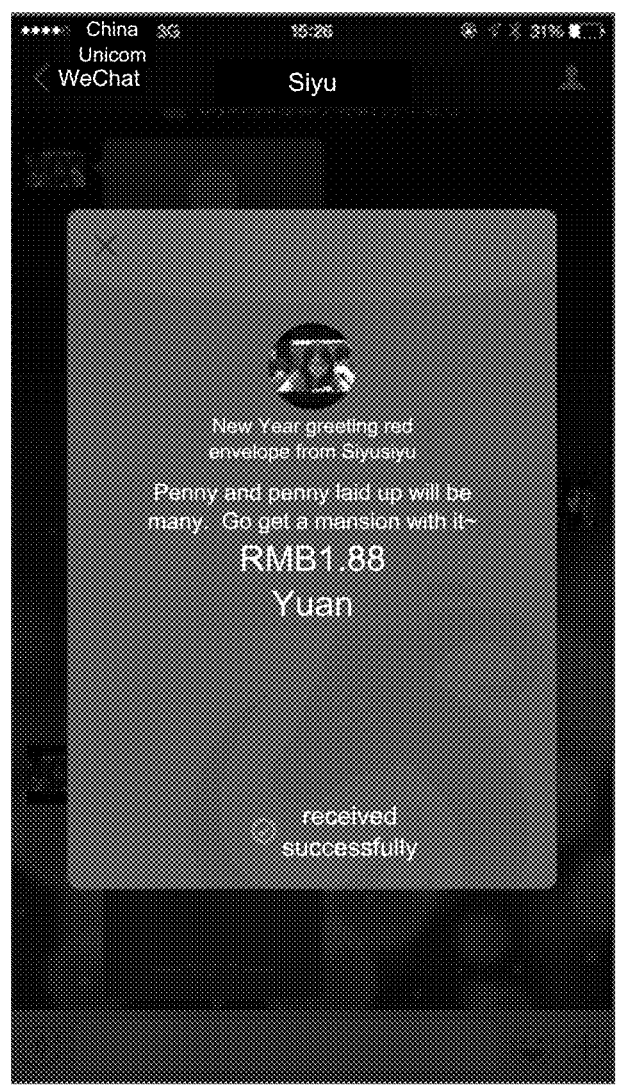
Figure 11:
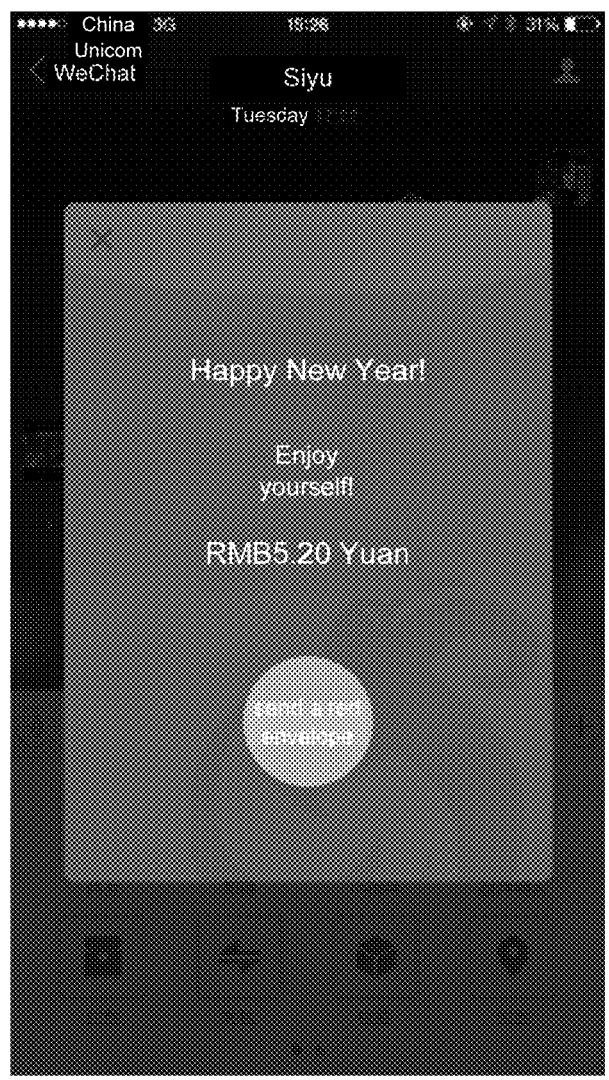

The acquired target numerical amount may be as shown in FIGS. 10-11. FIG. 10 shows a target numerical amount received by a red envelope receiver. FIG. 11 shows a target numerical amount displayed before a red envelope sender. The two numbers are but example. There may be no logic connection between the sender and the receiver.

A pseudorandom algorithm /dev/random may be implemented using a non-blocking random number generator in an operating system. Data in an entropy pool may be repeatedly used to generate pseudorandom data. In a scene of a random red envelope, each user operation of sending a New Year greeting red envelope may trigger the UE to send a request to the server. The server may call the pseudorandom algorithm of the system to generate a random amount and/or greetings by reusing the data recorded in the entropy pool.

A red envelope according to an embodiment herein may take on a form as follows.

Chat egg dropping may be triggered, such as after a receiver clicks on a red envelope bubble. Instead of triggering an egg only by a text message, a New Year greeting red envelope, as a message of a special type, may also trigger egg dropping in a chat. Amount rolling may also be triggered. after the user clicks on the New Year greeting red envelope, the server may return an amount and/or greetings to the UE. At the UE, a random effect may be displayed by rolling random numbers and stopping at a target numerical amount.

An integrated module according to embodiments herein, when implemented in form of a software functional module and sold or used as a separate product, may be stored in a computer readable storage medium. Based on such understanding, those skilled in the art shall understand that embodiments herein may be provided as a method, a system or a computer program product. Thus, the present disclosure may take on a form of complete hardware, complete software or a combination thereof. The present disclosure may take on a form of a computer program product implemented on one or more computer available storage media containing computer available program codes. The storage media may include, but are not limited to, a U disk, a mobile hard disk, a Read-Only Memory (ROM), a disk memory, a Compact Disc (CD)-ROM, an optical memory and the like.

The present disclosure has been described with reference to a flowchart and/or a block diagram of the method, device (system) and computer program product according to embodiments herein. It will be appreciated that each flow and/or block in the flowchart and/or the block diagram and a combination of the flows and/or the blocks in the flowchart and/or the block diagram may be implemented by computer program instructions. Such computer program instructions may be provided in a general-purpose computer, a dedicated computer, an embedded processor or a processor of another programmable data processing device to generate a machine, such that an apparatus for implementing functions designated in one or more flows in the flowchart and/or one or more blocks in the block diagram may be generated via instructions executed by the computer or the processor of the another programmable data processing device.

Such computer program instructions may also be stored in a computer readable memory capable of guiding a computer or another programmable data processing device to work in a specific mode, such that a manufactured product including an instruction apparatus is generated via the instructions stored in the computer readable memory, for implementing the functions designated in one or more flows of the flowchart and/or one or more blocks of the block diagram.

Such computer program instructions may also be loaded to a computer or another programmable data processing device, such that a series of operating steps are executed on the computer or the another programmable data processing device to generate computer implemented processing, such that the instructions executed on the computer or the another programmable device provide steps for implementing functions designated in one or more flows of the flowchart and/or one or more blocks of the block diagram.

Although embodiments herein have been described, once learning the basic creative concept herein, those skilled in the art may change and modify such embodiments. Thus, the appended claims are intended to be interpreted as covering the embodiments and all changes and modifications falling within the scope of the present disclosure.

An embodiment herein may also provide a non-transitory computer-readable storage medium having stored therein computer-executable instructions that, when executed by a processor, cause the processor to execute the information processing method according to an embodiment herein.

INDUSTRIAL APPLICABILITY

With the processing mode according to an embodiment herein, a first request is sent to a server via a first selectable command, such that the server returns a first message of a non-text type; when it is determined that the first message supports display of specified information, a second request is sent to the server via a first operation to draw random information; the random information drawn from the server is received, and display of the specified information is triggered in response to the first operation. A user is required to input no information at a UE side. Information needed by the user may be drawn automatically merely by interactive response to various requests and touch operations of the user, minimizing user time in waiting for a result of the operations, implementing efficient, fast, and convenient online processing. In addition, the information may be accompanied by the display of the specified information and special effect, providing rich visual effects/forms.

What is claimed is:

1. An information processing method, applying to a User Equipment (UE), the method comprising:
displaying a first selectable command on a User Interface (UI) of the UE, and sending, via the UI, a first request to a server, such that the server returns a first message of a non-text type;
receiving the first message returned by the server, and determining that the first message supports display of specified information;
receiving a first operation applied on a result displayed by the first message, and sending, via the first operation, a second request to the server to draw random information; and
in response to the first operation, triggering display of the specified information, and receiving the random information drawn from the server.

2. The method according to claim 1, wherein the in response to the first operation, triggering display of the specified information, and receiving the random information drawn from the server further comprises:
acquiring first information to be displayed, the first information to be displayed being randomly generated;
extracting first target information from the random information drawn from the server, and setting the first target information as second information to be displayed,
the first target information being information on a numerical amount less than a preset upper limit; and
displaying, on the UI of the UE according to a preset rule, a special effect of random display rolling from the first information to be displayed to the second information to be displayed.

3. The method according to claim 2, further comprising:
extracting second target information from the random information drawn from the server, and setting the second target information as third information to be displayed,
the second target information being multimedia information; and
simultaneously displaying, on the UI of the UE, both the third information to be displayed and the second information to be displayed.

4. The method according to claim 1, wherein the determining that the first message supports display of specified information comprises:
acquiring an established association logic that associates a non-text message with the specified information,
the association logic comprising at least identification of a non-text message, allowing a message type in line with the association logic to be identified by the identification; and
acquiring a first identification corresponding to the first message by analyzing the first message; determining, according to the first identification, whether the first message is of the message type in line with the association logic; and in response to determining that the first message is of the message type in line with the association logic, determining that the first message supports display of the specified information.

5. The method according to claim 4, wherein the association logic further comprises: in response to monitoring a pre-set operation, triggering display of the specified information as supported by the first message,
wherein the in response to the first operation, triggering display of the specified information comprises:
monitoring the first operation applied on the result displayed by the first message, and triggering the display of the specified information in response to determining the first operation matching the pre-set operation, wherein the pre-set operation comprises a screen touching operation on an interactive object in a page containing the result displayed by the first message.

6. A User Equipment (UE), comprising:
a processor; and
a memory configured for storing an instruction executable by the processor,
wherein the processor is configured for:
displaying a first selectable command on a User Interface (UI) of the UE;
sending, via the UI, a first request to a server, such that the server returns a first message of a non-text type;
receiving the first message returned by the server, and determining that the first message supports display of specified information;
receiving a first operation applied on a result displayed by the first message, and sending, via the first operation, a second request to the server to draw random information; and
in response to the first operation, triggering display of the specified information, and receiving the random information drawn from the server.

7. The UE according to claim 6, wherein the processor is further configured for:
acquiring first information to be displayed, the first information to be displayed being randomly generated; and
extracting first target information from the random information drawn from the server, and setting the first target information as second information to be displayed,
displaying, on the UI of the UE according to a preset rule, a special effect of random display rolling from the first information to be displayed to the second information to be displayed.

8. The UE according to claim 7, wherein the processor is further configured for: extracting second target information from the random information drawn from the server, and setting the second target information as third information to be displayed,
simultaneously displaying, on the UI of the UE, both the third information to be displayed and the second information to be displayed.

9. The UE according to claim 6, wherein the processor is further configured for:
acquiring an established association logic that associates a non-text message with the specified information, the association logic comprising at least identification of a non-text message, allowing a message type in line with the association logic to be identified by the identification; and
acquiring a first identification corresponding to the first message by analyzing the first message; determining, according to the first identification, whether the first message is of the message type in line with the association logic; and in response to determining that the first message is of the message type in line with the association logic, determining that the first message supports display of the specified information.

10. The UE according to claim 9, wherein the association logic further comprises: in response to monitoring a pre-set operation, triggering display of the specified information as supported by the first message, wherein the processor is further configured for:
monitoring the first operation applied on the result displayed by the first message, and triggering the display of the specified information in response to determining the first operation matching the pre-set operation, wherein the pre-set operation comprises a screen touching operation on an interactive object in a page containing the result displayed by the first message.

11. A non-transitory computer-readable storage medium, having stored therein computer-executable instructions that, when executed by a processor, cause the processor to execute at least one of an information processing method applying to a User Equipment (UE) and an information processing method applying to a server,
wherein the information processing method applying to the UE comprises:
displaying a first selectable command on a User Interface (UI) of the UE, and sending, via the UI, a first request to a server, such that the server returns a first message of a non-text type;
receiving the first message returned by the server, and determining that the first message supports display of specified information;
receiving a first operation applied on a result displayed by the first message, and sending, via the first operation, a second request to the server to draw random information; and
in response to the first operation, triggering display of the specified information, and receiving the random information drawn from the server,
wherein the information processing method applying to the server comprises:
receiving the first request sent by the UE via the UI, and returning the first message to the UE according to the first request, the first message being of the non-text type;
receiving the second request sent by the UE via the first operation applied on the result displayed by the first message, and extracting a preset rule according to the second request;
randomly generating the random information according to the preset rule; and
returning the random information to the UE.

\* \* \* \* \*